(12) United States Patent
Hummelgren

(10) Patent No.: US 6,983,260 B2
(45) Date of Patent: Jan. 3, 2006

(54) AUTOMATED EXCHANGE SYSTEM FOR TRADING ORDERS HAVING A HIDDEN VOLUME

(75) Inventor: Henrik Hummelgren, Solna (SE)

(73) Assignee: OMX Technology AB, Stockholm (SE)

( * ) Notice: Subject to any disclaimer, the term of this patent is extended or adjusted under 35 U.S.C. 154(b) by 637 days.

(21) Appl. No.: 09/827,314

(22) Filed: Apr. 6, 2001

(65) Prior Publication Data
US 2003/0033235 A1 Feb. 13, 2003

(51) Int. Cl.
*G06F 17/60* (2006.01)

(52) U.S. Cl. ........................................... 705/37
(58) Field of Classification Search .................. 705/35, 705/37, 44, 74
See application file for complete search history.

(56) References Cited

U.S. PATENT DOCUMENTS

| | | | | |
|---|---|---|---|---|
| 3,581,072 A | * | 5/1971 | Nymeyer | 705/37 |
| 4,674,044 A | * | 6/1987 | Kalmus et al. | 705/37 |
| 5,077,665 A | * | 12/1991 | Silverman et al. | 705/37 |
| 5,101,353 A | * | 3/1992 | Lupien et al. | 705/37 |
| 5,136,501 A | * | 8/1992 | Silverman et al. | 705/37 |
| 5,689,652 A | * | 11/1997 | Lupien et al. | 705/37 |
| 5,845,266 A | * | 12/1998 | Lupien et al. | 705/37 |
| 5,950,177 A | * | 9/1999 | Lupien et al. | 705/37 |
| 6,012,046 A | * | 1/2000 | Lupien et al. | 705/37 |
| 6,016,483 A | * | 1/2000 | Rickard et al. | 705/37 |
| 6,018,722 A | * | 1/2000 | Ray et al. | 705/36 |
| 6,058,379 A | * | 5/2000 | Odom et al. | 705/37 |
| 6,098,051 A | * | 8/2000 | Lupien et al. | 705/37 |

* cited by examiner

*Primary Examiner*—Vincent Millin
*Assistant Examiner*—Sandra Snapp
(74) *Attorney, Agent, or Firm*—Nixon & Vanderhye P.C.

(57) ABSTRACT

An automated exchange system for trading an order having a hidden volume. An order is received requesting a hidden volume trade. The automated exchange generates an open volume with a random/pseudo-random size and/or at a random/pseudo-random time based on one or more parameters associated with the order.

32 Claims, 2 Drawing Sheets

US 6,983,260 B2

AUTOMATED EXCHANGE SYSTEM FOR TRADING ORDERS HAVING A HIDDEN VOLUME

TECHNICAL FIELD

The present invention-relates to an automated exchange system, and in particular to an automated exchange designed to execute orders having a hidden volume.

BACKGROUND OF THE INVENTION

When trading shares and other financial instruments in an automated exchange, both buyers and seller of course want to get the best possible price. A seller of a particular financial instrument is interested in getting a high price, whereas a buyer is interested in getting a low price.

The price is determined by the market. Thus, the price is likely to go up if there are many sellers and few buyers of a particular financial instrument at a particular price, and vice versa.

Sometimes a seller or buyer may want to sell/buy a large volume of a particular financial instrument. If the order having the large volume was to be placed in the market as one single order, there is a great likelihood that there would be a negative impact on the market. Thus, the price for that particular financial instrument changes in a direction not wanted by the seller/buyer placing the order having the large volume. See also Schwartz et al: "Next-generation securities market systems: An experimental investigation of quote-driven and order-driven trading", Journal of Management Information Systems, vol 14, no 2, pp 57–79, 09 1997, ISSN 0742–1222.

In order to reduce the impact on the market, it is common that the seller places his selling order in small bits or fractions. In this way only a fraction of the total volume of the order is displayed at each instant. The rest of the order is thus hidden from other investors, and the order is usually referred to as an order having a "hidden volume". When the whole first fraction has been traded, a second fraction having the same volume as the first fraction is generated and displayed. This pattern is repeated until the entire volume of the order has been traded.

In an automated exchange system, there are two main ways of placing orders having a hidden volume. A first way is to manually only enter a small fraction at the time of the order into the automated exchange and wait for that first fraction of the order to be traded before entering the next fraction. The second way is to provide functionality in the automated exchange system that enables trading with a hidden volume in an electronic market. In the second case, the investor enters his order in a conventional way but at the same time he instructs the automated exchange system to handle the order as an order having a hidden volume and also specifies the fraction size. The automated exchange then only displays a fraction of the order at the time, and when the first fraction is traded, the exchange system automatically displays a second identical fraction of the order etc. However, since this is a known way of trading an order having a large volume in an automated exchange other investors are aware that orders having a hidden volume exist. Therefore, when investors observe the behavior of other investors, they can quite easily spot an investor trading an order having a hidden volume, since a new order having the very same size is generated when the first order is traded, although they cannot know the total volume of the order.

However, since this is a known way of trading an order having a large volume in an automated exchange other investors are aware of that orders having a hidden volume exist. Therefore, when investors observe the behavior of other investors they can quite easily spot an investor trading an order having a hidden volume, since a new order having the very same size is generated when the first order is traded, although they cannot, know the total volume of the order.

The fact that others can detect an order having a hidden volume reduces the positive effect of trading an order with a hidden volume, and the market impact can become significant.

SUMMARY

It is an object of the present invention to provide an improved computerized trading system for trading orders having a hidden volume. This objects and others are obtained by the present invention as set out in the appended claims.

Thus, in an automated exchange system having means for trading an order having a hidden volume, means are provided for receiving an order placed by an investor, the order having a number of parameters associated therewith. The automated exchange system further comprising means for, based on the parameters associated with the order, generating an open volume having a random/pseudo random size and/or at a random/pseudo random time.

By generating the open volume with a random/pseudo random size and/or at random/pseudo random times, when trading an order having a hidden volume the risk of others detecting that a large order having a hidden volume has been placed on the market can be significantly reduced. By reducing this risk, the market impact can be shown to be smaller and the investor, i.e. the seller/buyer, can therefore expect to obtain a better price. At the same time the amount of manual labor required for trading the order at a price acceptable for the investor is significantly reduced.

BRIEF DESCRIPTION OF THE DRAWINGS

The present invention will now be described in more detail by way of non-limiting examples and with reference to the accompanying drawings, in which.

DESCRIPTION OF PREFERRED EMBODIMENTS

Figure 1:
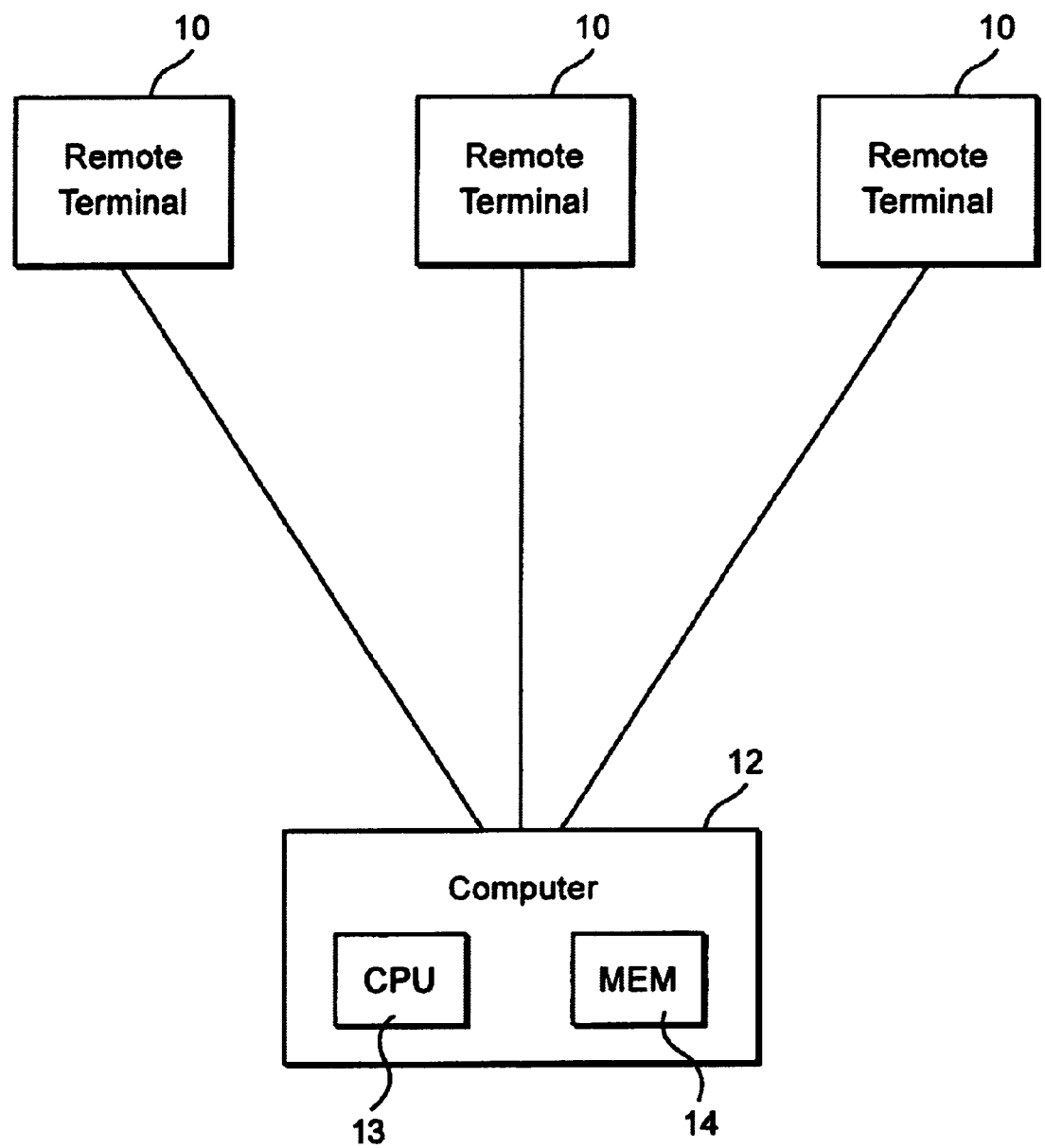
FIG. 1 is a general view of an automated exchange system

In FIG. 1, a general view of an automated exchange system is shown. The system comprises a number of remote terminals 10 all connected to a central computer 12 comprising a Central Processing Unit (CPU) 13 and a memory 14 associated therewith. The central computer 12 being loaded with suitable software, such as the SAXESS ® software sold by OM Technology AB, Sweden, forms an automated exchange. The remote terminals are designed to send data to and receive data from the central computer 12. The terminals 10 are designed to provide an interface for investors, such as broker firms etc., trading financial instruments at the automated exchange.

Moreover, the terminals 10 and the computer 12 are designed and configured to exchange data as described below in conjunction with FIG. 2 when an order having a hidden volume is sent from a terminal 10 to the computer 12.

Figure 2:
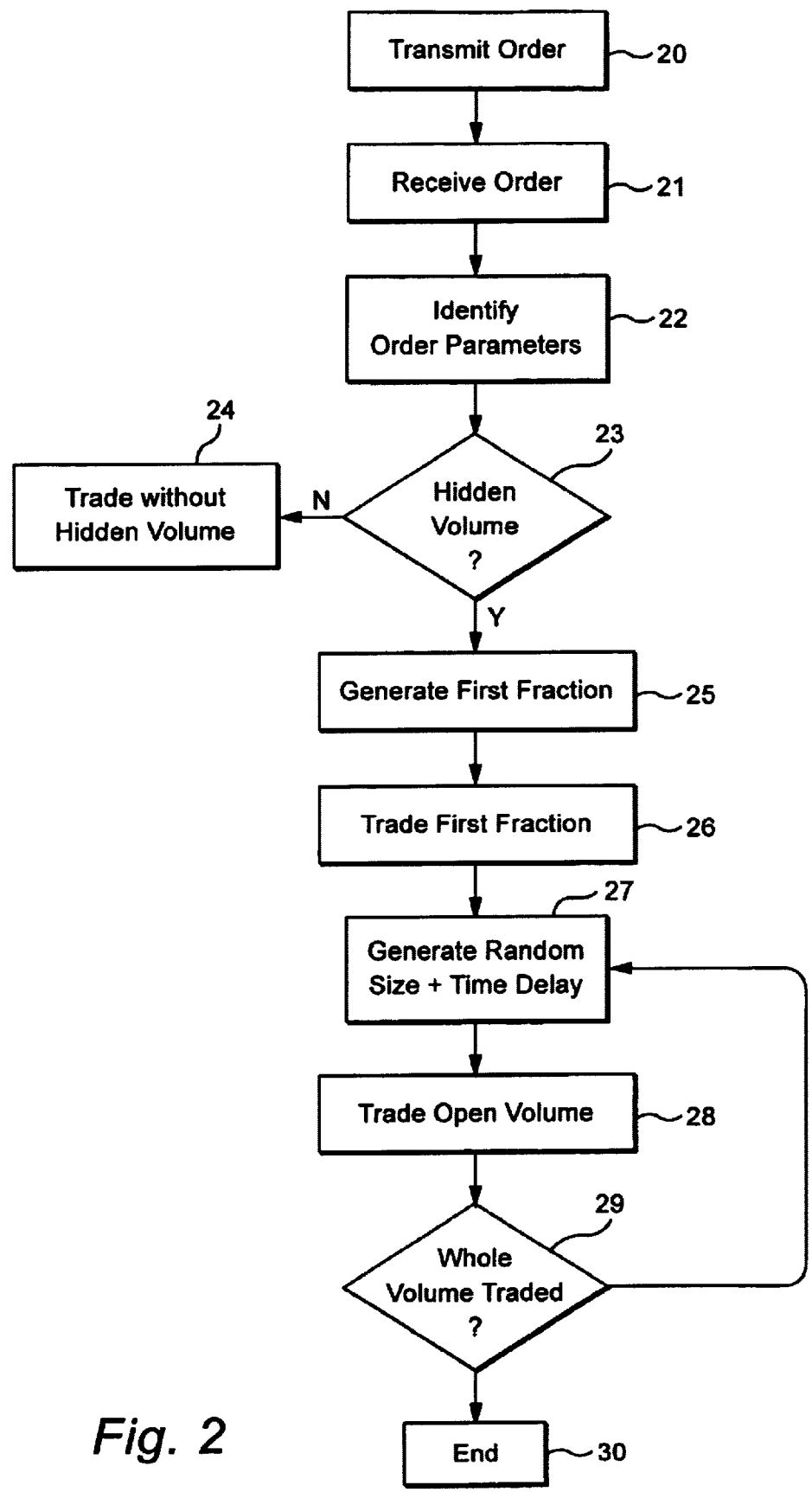
FIG. 2 is a flow chart illustrating different steps performed in the automated exchange system when executing an order having a hidden volume

In FIG. 2, a flowchart illustrating different steps performed in the system shown in FIG. 1 when trading an order having a hidden . . . volume . . . First, in a step 2C, an order to trade a particular financial instrument, e.g. a share in a particular company is sent from one of the remote terminals 10 to the computer system 12 forming the automated exchange.

The order sent in step 20 comprises is associated with a number of parameters. One of the parameters indicate to the computer system 12 that the order is to be traded with a hidden volume, i.e. so that the entire order volume is not displayed at once but only a fraction thereof. In a preferred embodiment the order is also associated with a number of additional parameters indicating how the order having the hidden volume should be traded.

The order is received by the computer system 12, step 21. The computer system 12, by reading the parameters associated with the order, identifies the order, step 22. The computer system 12 then checks if the order is an order that should be traded with a hidden volume, step 23. If the order specifies trading without a hidden volume the order is treated in a conventional manner as indicated in step 24. If trading with a hidden volume is indicated, the computer 12 then displays a first fraction of the order, which usually is termed the open volume, step 25.

When the open volume has been traded at the automated exchange formed by the computer system 12, step 26, the computer system generates a new open volume, step 27. The new open volume is generated with a size and at a time being randomized by the computer system 12.

The order can, as described above, be associated with additional parameters. In that case the additional parameters can be used to determine the range within which the size of the open volume, referred to as a fraction of the order, is generated and also the range of the time delay. For example, the user can set a minimum time delay and a maximum time delay.

In a preferred example embodiment the user can, for example using a broker work station, not only select the range within which the fractions of the order are to be generated, but also the distribution of the randomly generated fractions. Also, the user can be given the option to set the distribution for the time delays and the range within which the time delays are generated. Suitable distribution functions can for example be a uniform distribution.

A new open volume is in this manner generated until the entire order has been traded, steps 28, 29 and 30.

Using the trading system as described herein will significantly reduce the amount of manual work required when trading a large order in an automated exchange system.

While the present invention has been described with respect to particular embodiments, those skilled in the art will recognize that the present invention is not limited to these specific exemplary embodiments. Different formats, embodiments, and adaptations besides those shown and described as well as many variations, modifications, and equivalent arrangements may also be used to implement the invention. Therefore, while the present invention has been described in relation to its preferred embodiments, it is to be understood that this disclosure is only illustrative and exemplary of the present invention. Accordingly, it is intended that the invention be limited only by the scope of the claims appended hereto.

What is claimed is:

1. An automated exchange comprising a data processor unit having a memory associated therewith, the exchange having means for receiving and trading an order received from an investor, the order having a specified total volume and a number of parameters identifying the order, the exchange further having means for only displaying a fraction of the total volume, the exchange further comprising a unit for randomly generating the size of said fraction of the total volume and/or randomly determining when in time said fraction is generated.

2. An automated exchange according to claim 1, the exchange further comprising means for setting a distribution function used when generating said randomly generated fractions and/or randomly determined times in accordance with said number of parameters.

3. A broker work station for entering and transmitting orders to an automated exchange, the exchange comprising a data processor unit having a memory associated therewith, means for receiving and trading a received order, the order having a specified total volume and a number of parameters identifying the order, the exchange further having means for only displaying a fraction of the total volume, and a unit for randomly generating the size of said fraction of the total volume and/or when in time said fraction is generated, the broker work station comprising means for setting a number of parameters defining a particular order for transmission to said automated exchange, one of the parameters identifying the order as an order to be traded with a hidden volume, the broker work station further comprising means for setting at least one additional parameter defining when the order is set to be traded with a hidden volume.

4. A broker work station in accordance with claim 3, further comprising means for setting a parameter indicating to the automated exchange how to generate said fractions and times.

5. In an automated exchange comprising a data processor unit having a memory associated therewith, the exchange receiving and trading orders received from an investor, the orders having a specified total volume, a method of displaying the orders to the market, the method comprising only displaying a fraction of the total volume, and generating the size of said fraction of the total volume as a random size and/or randomly determining when in time said fraction is generated.

6. A method according to claim 5, further comprising the step of determining said sizes and/or times in accordance with a distribution function as indicated by a parameter associated with the orders.

7. An automated exchange comprising:
a data processor and associated memory for communicating with one or more trading terminals including a display, the data processor being configured to perform the following tasks:
a—receive an order from an investor having a total volume and a request to divide the total volume up into fractional volumes and to trade the total volume as a series of successive fractional volume trades;
b—generate a first fraction of the total volume and send information to the one or more trading terminals to display the first fraction of the total volume but not the total volume;
c—execute a trade of the first fractional volume;
d—generate a next fraction of the total volume different from the first fractional volume;
e—send information to the one or more trading terminals to display the next fraction of the total volume but not the total volume; and
f—execute a trade of the next fraction of the total volume.

8. The automated exchange in claim 7, wherein the data processor is configured to repeat tasks (d)–(f) until the total volume is traded.

9. The automated exchange in claim 7, wherein the data processor is configured to randomly determine when the next fraction is generated.

10. The automated exchange in claim 9, wherein the data processor is configured to randomly determine when the next fraction is generated in accordance with a distribution function.

11. The automated exchange in claim 9, wherein the order request is a hidden volume order that includes a parameter specifying when to generate the first and next fractional volumes.

12. The automated exchange in claim 7, wherein the data processor is configured to randomly generate the next fraction in accordance with a distribution function.

13. The automated exchange in claim 7, wherein the order request is a hidden volume order that includes a parameter specifying how to generate the first and next fractional volumes.

14. An automated exchange comprising:
a data processor and associated memory for communicating with one or more trading terminals including a display, the data processor being configured to perform the following tasks:
a—receive an order from an investor having a total volume and a request to divide the total volume up into fractional volumes and to trade the total volume as a series of successive fractional volume trades;
b—generate a first fraction of the total volume and send information to the one or more trading terminals to display the first fraction of the total volume but not the total volume;
c—execute a trade of the first fractional volume;
d—selectively determine a time delay after the executed trade when a next fraction of the total volume is to be displayed for trading;
e—after the selectively determined time delay, send information to the one or more trading terminals to display the next fraction of the total volume but not the total volume at the determined time; and
f—execute a trade of the next fraction of the total volume.

15. The automated exchange in claim 14, wherein the data processor is configured to repeat tasks (d)–(f) until the total volume is traded.

16. The automated exchange in claim 14, wherein the data processor is configured to randomly determine the delay time.

17. The automated exchange in claim 14, wherein the data processor is configured to randomly determine the delay time in accordance with a distribution function.

18. The automated exchange in claim 14, wherein the first and next fractional volumes are different.

19. The automated exchange in claim 18, wherein the data processor is configured to randomly generate the first and next fractional volumes.

20. In an automated exchange including a data processor and associated memory for communicating with one or more trading terminals including a display, a method comprising:
a—receiving an order from an investor having a total volume and a request to divide the total volume up into fractional volumes and to trade the total volume as a series of successive fractional volume trades;
b—generating a first fraction of the total volume and send information to the one or more trading terminals to display the first fraction of the total volume but not the total volume;
c—executing a trade of the first fractional volume;
d—generating a next fraction of the total volume different from the first fractional volume;
e—sending information to the one or more trading terminals to display the next fraction of the total volume but not the total volume; and
f—executing a trade of the next fraction of the total volume.

21. The method in claim 20, further comprising:
repeating tasks (d)–(f) until the total volume is traded.

22. The method in claim 20, further comprising:
randomly determining when the next fraction is generated.

23. The method in claim 22, wherein the next fraction is randomly generated in accordance with a distribution function.

24. The method in claim 20, wherein the order request is a hidden volume order that includes a parameter specifying when to generate the first and next fractional volumes.

25. The method in claim 20, wherein the next fraction is randomly generated in accordance with a distribution function.

26. The method in claim 20, wherein the order request is a hidden volume order that includes a parameter specifying how to generate the first and next fractional volumes.

27. In an automated exchange including a data processor and associated memory for communicating with one or more trading terminals including a display, a method comprising:
a—receiving an order from an investor having a total volume and a request to divide the total volume up into fractional volumes and trade the total volume as a series of successive fractional volume trades;
b—generating a first fraction of the total volume and send information to the one or more trading terminals to display the first fraction of the total volume but not the total volume;
c—executing a trade of the first fractional volume;
d—selectively determining a time delay after the executed trade when a next fraction of the total volume is to be displayed for trading;
e—after the selectively determined time delay, sending information to the one or more trading terminals to display the next fraction of the total volume but not the total volume at the determined time; and
f—executing a trade of the next fraction of the total volume.

28. The method in claim 27, wherein the data processor is configured to repeat tasks (d)–(f) until the total volume is traded.

29. The method in claim 27, wherein the data processor is configured to randomly determine the delay time.

30. The method in claim 29, wherein the data processor is configured to randomly determine the delay time in accordance with a distribution function.

31. The method in claim 27, wherein the first and next fractional volumes are different.

32. The automated exchange in claim 31, wherein the data processor is configured to randomly generate the first and next fractional volumes.

* * * * *